United States Patent [19]

Hagen et al.

[11] Patent Number: 5,651,562
[45] Date of Patent: Jul. 29, 1997

[54] RELEASE MECHANISM

[75] Inventors: George T. Hagen, Troy; Gary G. Gordon, Southfield, both of Mich.

[73] Assignees: TRW Inc.; TRW Vehicle Safety Systems Inc., both of Lyndhurst, Ohio

[21] Appl. No.: 608,176

[22] Filed: Feb. 28, 1996

[51] Int. Cl.$^6$ .................................................. B60R 21/20
[52] U.S. Cl. ................................ 280/728.3; 280/728.2
[58] Field of Search ........................... 280/728.3, 728.2, 280/732, 728.1, 731; 24/455, 458; 403/292, 297

[56] References Cited

U.S. PATENT DOCUMENTS

| | | | |
|---|---|---|---|
| 5,150,919 | 9/1992 | Sakakida et al. | 280/732 |
| 5,199,834 | 4/1993 | Seidl et al. | 411/5 |
| 5,211,421 | 5/1993 | Catron et al. | 280/728.1 |
| 5,350,190 | 9/1994 | Szigethy | 280/728.2 |
| 5,354,094 | 10/1994 | Matsuo et al. | 280/728.3 |
| 5,403,034 | 4/1995 | Gans et al. | 280/728.2 |
| 5,458,365 | 10/1995 | Rogers et al. | 280/728.3 |
| 5,496,060 | 3/1996 | Whited et al. | 280/728.3 |
| 5,520,410 | 5/1996 | Sun | 280/728.3 |
| 5,527,063 | 6/1996 | Garner et al. | 280/728.2 |

FOREIGN PATENT DOCUMENTS

4243646  8/1992  Japan ............................ 280/728.2

*Primary Examiner*—Christopher P. Ellis
*Attorney, Agent, or Firm*—Tarolli, Sundheim, Covell, Tummino & Szabo

[57] ABSTRACT

An apparatus (10) for helping to protect a vehicle occupant during a vehicle collision includes an inflatable vehicle occupant protection device (40) deployable through a first opening (24) in a vehicle part (20). A cover (60) closes the first opening (24) in the vehicle part. A plurality of fasteners (100) releasably attach the cover (60) to the vehicle part (20). The fasteners (100) each comprise means for attaching the fastener (100) to the cover (60). The means for attaching the fastener (100) to the cover (60) include a plurality of deformable arms (112) defining a conical head portion (104) of the fastener. The arms (112) are deformable upon insertion into one of a plurality of second openings (82) and return toward their original shape after insertion into one of the second openings. A fin portion (108) of the fastener is adjacent to and extends from the conical head portion (104). The apparatus (10) includes means (28, 30, 170) for attaching the fin portion (108) to the vehicle part (20).

20 Claims, 10 Drawing Sheets

RELEASE MECHANISM

FIELD OF THE INVENTION

The present invention relates to a vehicle occupant protection device, and particularly relates to a fastener assembly for releasably mounting a cover for a vehicle occupant protection device to a vehicle part.

BACKGROUND OF THE INVENTION

An inflatable vehicle occupant protection device, such as an air bag, protects a vehicle occupant during a collision requiring inflation of the protection device. The inflatable vehicle occupant protection device is mounted to a vehicle part and is inflatable through an opening in the vehicle part. A cover is releasably secured by a plurality of fasteners to the vehicle part to conceal the opening. Upon deployment of the protection device, the fasteners release the cover from the vehicle part.

SUMMARY OF THE INVENTION

The present invention is an apparatus for helping to protect a vehicle occupant during a collision for which protection of the vehicle occupant is required. The apparatus preferably comprises an inflatable vehicle occupant protection device. The inflatable vehicle occupant protection device is deployable through a first opening in a part of the vehicle when inflated. A cover is securable to the vehicle part and closes the first opening in the vehicle part. The apparatus includes a plurality of fasteners for releasably attaching the cover to the vehicle part.

Each of the plurality of fasteners comprises means for attaching the fastener to the cover. The means for attaching the fastener to the cover includes a plurality of deformable arms defining a conical head portion of the fastener. The arms are deformable upon insertion into one of a plurality of second openings in the cover and return toward their original shape after insertion into one of the second openings. Each of the fasteners also includes a fin portion adjacent to, and extending from, the conical head portion. Each of the fasteners also includes means for attaching the fin portion to the vehicle part.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
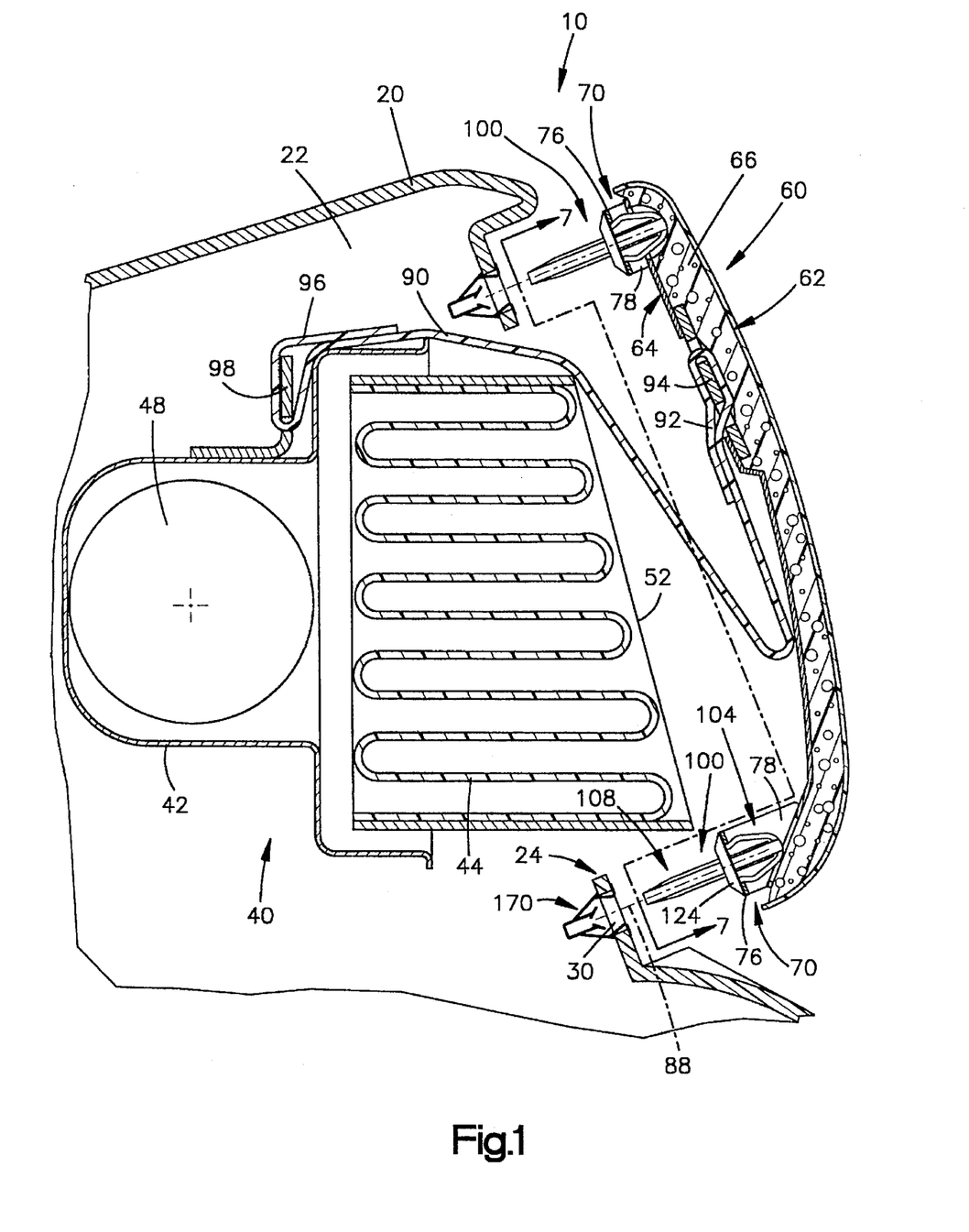
FIG. 1 is a schematic sectional view of a portion of a vehicle occupant protection device embodying the present invention.

As representative of the present invention, FIG. 1 illustrates a vehicle occupant protection device 10. The vehicle occupant protection device 10 may be mounted in various locations in a vehicle. As illustrated, the device 10 is mounted in a vehicle instrument panel 20. The vehicle instrument panel 20 partially defines a chamber 22 having a first rectangular opening 24. Disposed adjacent to the first rectangular opening 24 are a plurality of edge portions 28 of the instrument panel 20 (FIG. 3) defining a plurality of second rectangular openings 30 (FIG. 1). The first rectangular opening 24 is of a sufficient size to allow insertion of an inflatable vehicle occupant protection module 40, which comprises the vehicle occupant protection device 10, through the first rectangular opening and into the chamber 22.

The vehicle occupant protection module 40 comprises a reaction canister 42 to which an inflatable air bag 44 is attached by conventional means. The reaction canister 42 also houses an inflator 48 for supplying inflation fluid to the air bag 44. The inflator 48 is actuatable to direct inflation fluid to the air bag 44 to inflate the air bag upon the occurrence of an event indicating a vehicle collision requiring air bag inflation to help protect a vehicle occupant.

The inflatable air bag 44 is shown in FIG. 1 in its undeployed condition, i.e., the air bag 44 is packed within the reaction canister 42. Also, the air bag 44 is encircled by a tearable film cover 52 so that the air bag 44 remains in its packed state until deployment of the air bag. Upon deployment of the air bag 44 (FIG. 8), the tearable film cover 52 tears to release the air bag for inflation.

A cover 60 (FIG. 1) is releasably attached to the instrument panel 20. The cover 60 is of sufficient size to cover the first rectangular opening 24 in the instrument panel 20 so that the air bag 44 and reaction canister 42 are not visible to the occupants of the vehicle.

The cover 60 (FIG. 7) is generally rectangular in shape and has an outer surface 62 (FIG. 1) and an inner surface 64. Disposed between the surfaces 62 and 64 is a cushion portion 66 preferably made of polyurethane. The outer surface 62 is preferably made of a soft plastic material. The inner surface 64 is made of a more rigid material than the cushion portion 66 and may be made of sheet metal. The construction of the cover 60 may vary from the illustrated construction.

A plurality of identical brackets 70 are attached to the inner surface 64 of the cover 60. The brackets 70, as can best be seen by the exemplary bracket in FIG. 4, include two opposed essentially planar end portions 72 and an essentially planar base wall 76, parallel to, and spaced apart from, the end portions by a given distance. The brackets 70 also include two opposed connector portions 78. Each connector portion 78 extends between and connects one of the end portions 72 to a respective edge of the base wall 76.

Figure 5:
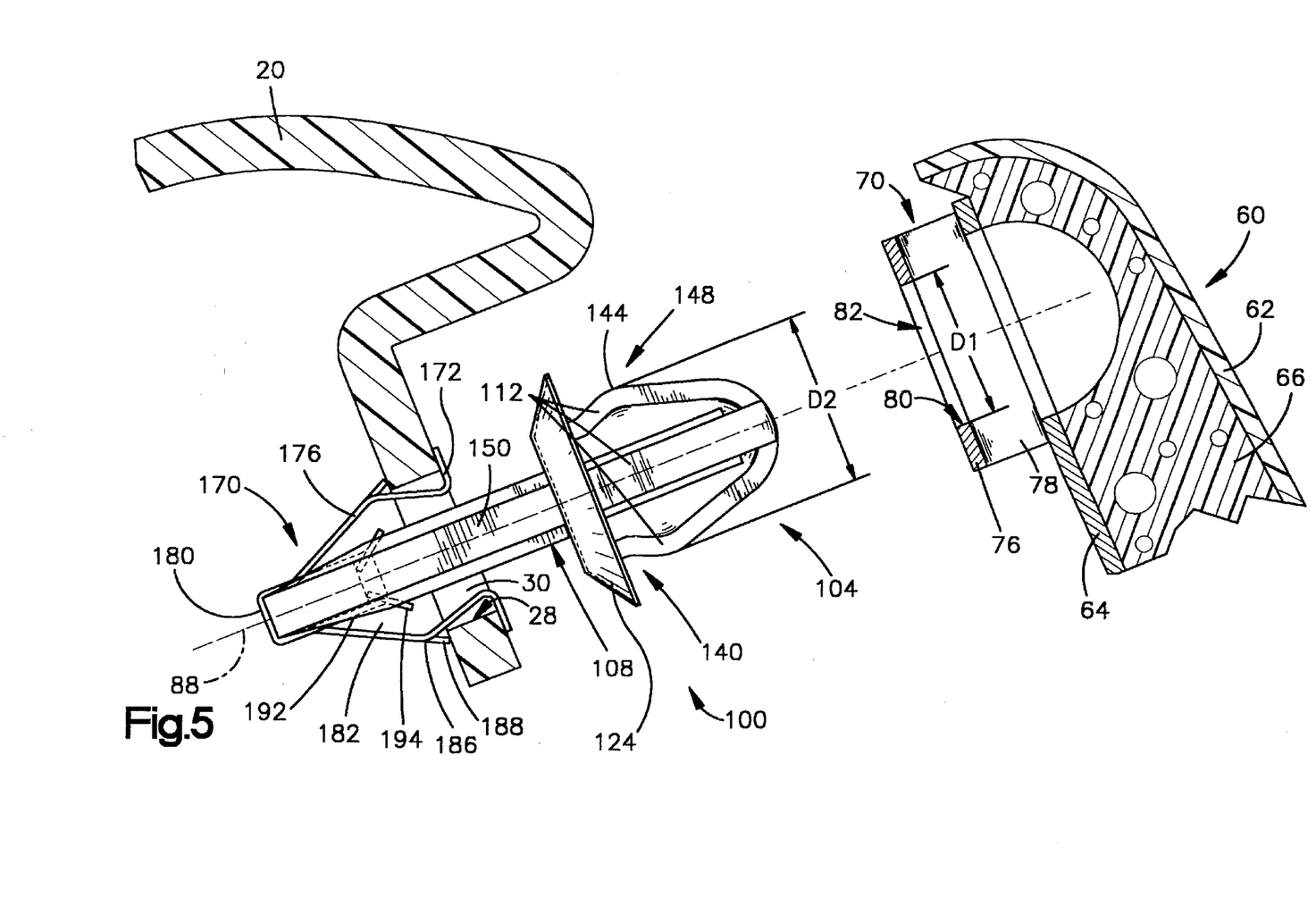
FIG. 5 is a view similar to FIG. 3 showing parts in a different position.

The base wall 76 is provided with a cylindrical inner surface 80 defining a cylindrical opening 82 having a first diameter, D1, as shown in FIG. 5. Both the cylindrical inner surface 80 and the cylindrical opening 82 are centered on an axis 88. The end portions 72 of the brackets 70 can be attached to the inner surface 64 (FIG. 1) of the cover 60 by any type of conventional means or if both the inner surface 64 and brackets were made of a plastic material, the brackets could be integrally molded with the cover. As shown in FIG. 1, the cover 60 may be provided with different sized brackets 70. The brackets 70 can differ in size, for example, by having different length connector portions 78. The length of the connector portions 78 will vary, as shown in FIG. 1, in dependence upon the spacing and orientation of the cover 60 with respect to the instrument panel 20.

Figure 4:
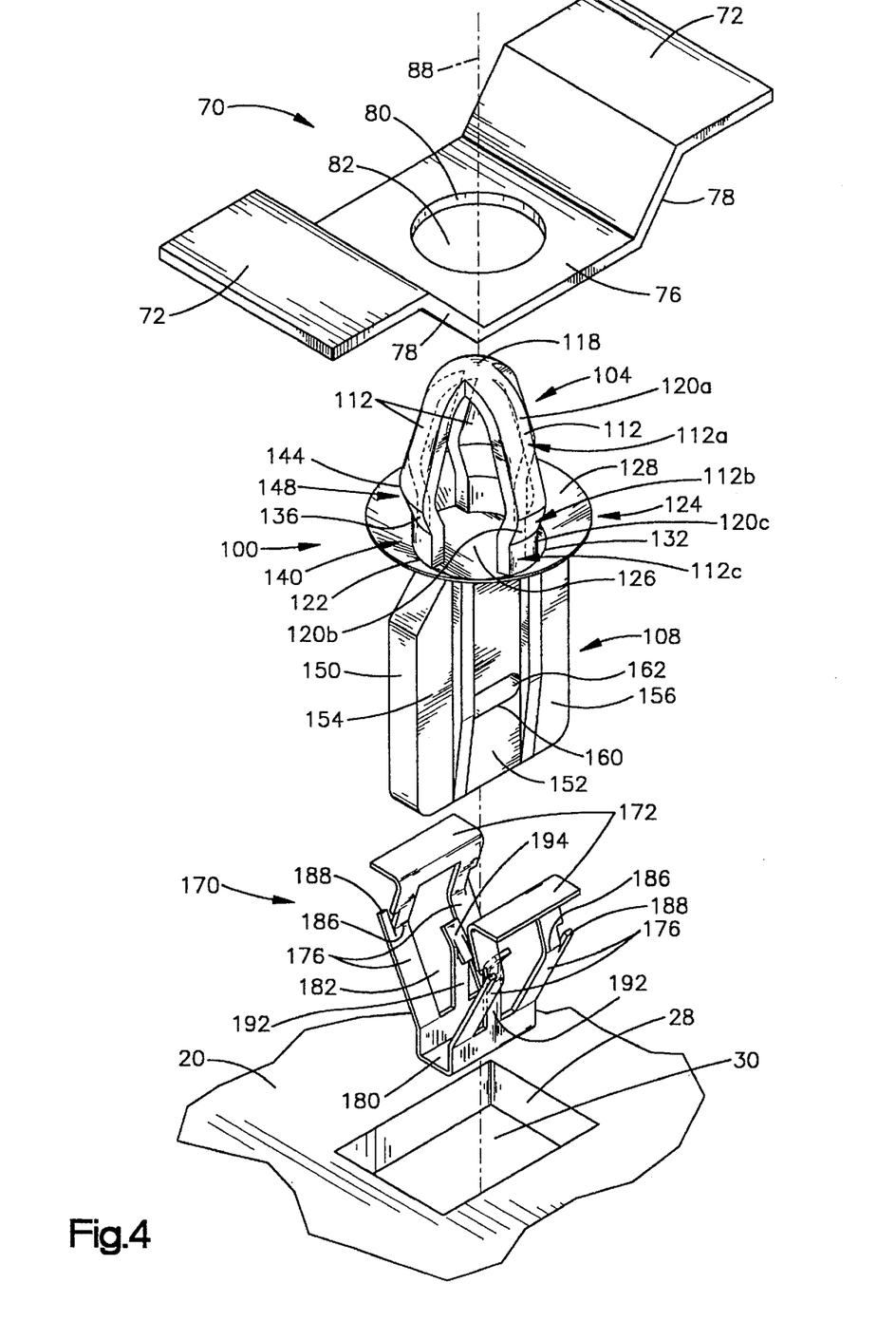
FIG. 4 is an exploded view of parts shown in FIG. 3.

As illustrated in the preferred embodiment of the invention, a plurality of fasteners 100 (FIG. 1) releasably attach the cover 60 to the instrument panel 20. The plurality of fasteners 100 are identical in configuration. FIG. 4 illustrates one of the fasteners 100. The fastener 100 shown in FIG. 4 has a conical head portion 104 and an essentially planar fin portion 108. Both the conical head portion 104 and the fin portion 108 are symmetrical about the axis 88. The fasteners 100 preferably are molded one-piece plastic parts.

The conical head portion 104 includes a plurality of identical yieldably deformable arms 112. The arms 112 are spaced apart equal distances. In the embodiment illustrated in FIG. 4, three arms 112 form the conical head portion 104. However, it is anticipated that any number of arms 112 could be employed to form the conical head portion 104.

The arms 112 are connected to each other at one end to form a nose portion 118 of the conical head portion 104. The nose portion 118 is rounded in shape. Each arm 112 is comprised of a first, second and third portion 112a–c. Each of the portions 112a–c of the arms 112 have an outer surface 120a–c, respectively. The first portion 112a extends axially and radially outward (i.e., away from axis 88) from the nose portion 118. The second portion 112b extends axially and radially inward from the first portion 112a. The third portion 112c extends generally axially from the second portion 112b and attaches at a distal end 122 to a dish portion 124. Thus, the conical head portion 104 has a bird cage-like configuration.

The dish portion 124 has a flat circular base portion 126 and a concave wall portion 128 extending upward from a peripheral edge portion 132 of the circular base portion. The concave wall portion 128 circumscribes the conical head portion 104. The distal ends 122 of the arms 112 attach to the circular base portion 126 adjacent the edge portion 132. The concave wall portion 128 is relatively thin and flexible.

Adjacent the dish portion 124, the second and third portions 112b and 112c of the arms 112 cooperate to form an annular groove 140 in the conical head portion 104. A ridge portion 144 of each arm 112 is located directly above, as viewed in FIG. 4, the annular groove 140, at the location where the first portion 112a and the second portion 112b converge. The ridge portions 144 of the arms 112 cooperate to form an outer peripheral portion 148 of the conical head portion 104. The outer peripheral portion 148 of the conical head portion 104 has a second diameter, D2, as shown in FIG. 5, which is larger than the first diameter, D1, of the cylindrical openings 82 of the brackets 70.

Directly adjacent and below the base portion 126 of the dish 124 is the essentially planar fin portion 108. The fin portion 108 comprises a shank 150 which depends downwardly from the dish portion 124 as shown in FIG. 4. The shank 150 is essentially rectangular in shape. The shank 150 has a middle portion 152 and two lateral side portions 154, 156 adjacent opposing sides of the middle portion. Disposed within the middle portion 152 of the shank 150 is a rectangular edge portion 160 defining a third rectangular opening 162 extending through the shank.

A plurality of flexible spring clips 170 (FIG. 1) are provided for attaching to the shanks 150 of the fasteners 100. The plurality of spring clips 170 also attach to the instrument panel 20. Thus, the spring clips 170 attach the fasteners 100 to the instrument panel 20. The spring clips 170 are identical in construction.

The spring clips 170, as can best be seen in FIG. 4, comprise a pair of spaced apart clip flanges 172. Extending from either clip flange 172 is a pair of clip legs 176. The four clip legs 176 extend downward from the clip flanges 172 and are joined by a connecting wall 180. The clip flanges 172, clip legs 176, and the connecting wall 180 give the spring clip 170 a V-shaped design forming a channel 182.

The clip legs 176 have outwardly extending ridges 186. Extending from the ridges 186 are tabs 188. The spring clip 100 has two spring feet 192 bent inwardly to engage the shank 150 of the fastener 100. The spring feet 192 have inwardly extending tongue portions 194 which engage the rectangular edge portion 160 that defines the third rectangular opening 162 in the shank 150 for providing the necessary engagement.

The plurality of fasteners 100 releasably attach the cover 60 (FIG. 1) to the instrument panel 20. Since the fasteners 100 are identical, the manner in which the plurality of fasteners operate to attach the cover 60 releasably to the instrument panel 20 will be described with reference to one exemplary fastener with the understanding that all of the fasteners function in the same manner.

The conical head portion 104 (FIG. 4) of the fastener 100 is inserted axially through the cylindrical opening 82 of the bracket 70. As discussed above, the conical head portion 104 of the fastener 100 is made of a yieldably deformable material, (i.e., material which resumes its original shape after the force causing its deformation has ceased) such as plastic. Thus, during the axial insertion of the fastener 100 into the cylindrical opening 82 of the bracket 70, the arms 112 of the conical head portion 104 are deflected or compressed radially inward by the cylindrical inner surface 80 of the bracket as the outer surfaces 120a of the first portions 112a of the arms 112 engage the cylindrical inner surface 80. Accordingly, the second diameter of the outer peripheral portion 148 of the fastener 100 is reduced sufficiently so that the conical head portion 104 is insertable through the cylindrical opening 82 of the bracket 70. Once the outer peripheral portion 148 of the head portion 104 (FIG. 1) passes the cylindrical inner surface 80 as the axial insertion of the fastener 100 continues, the arms 112 begin to expand radially outward toward their initial positions. The axial movement of the fastener 100 continues until the outer surfaces 120c of the third portions 112c of the arms 112 engage the cylindrical inner surface 80 of the cylindrical opening 82. Thus, the outer peripheral portion 148 of the conical head portion 104 returns to its initial, second diameter, D2, which is larger than the first diameter, D1, of the cylindrical opening 82 of the bracket 70. The annular groove 140, which has a third diameter substantially the same size as the first diameter of the cylindrical opening 82 of the bracket 70, is received within the cylindrical opening of the bracket. The cylindrical inner surface 82 that defines the cylindrical opening 82 circumscribes the annular groove 140 of the conical head portion 104, thereby attaching the fastener 100 to the cover 60 as can be seen in FIG. 1.

Once the conical head portion 104 has been attached to the cover 60, the spring clip 170 (FIG. 4) is attached to the shank 150 of the fin portion 108 of the fastener 100. The spring clip 170 is positioned on the shank 150 of the fin portion 108 so that the tongue portions 194 are received within the third rectangular opening 162 of the shank 150.

Figures 2, 3:
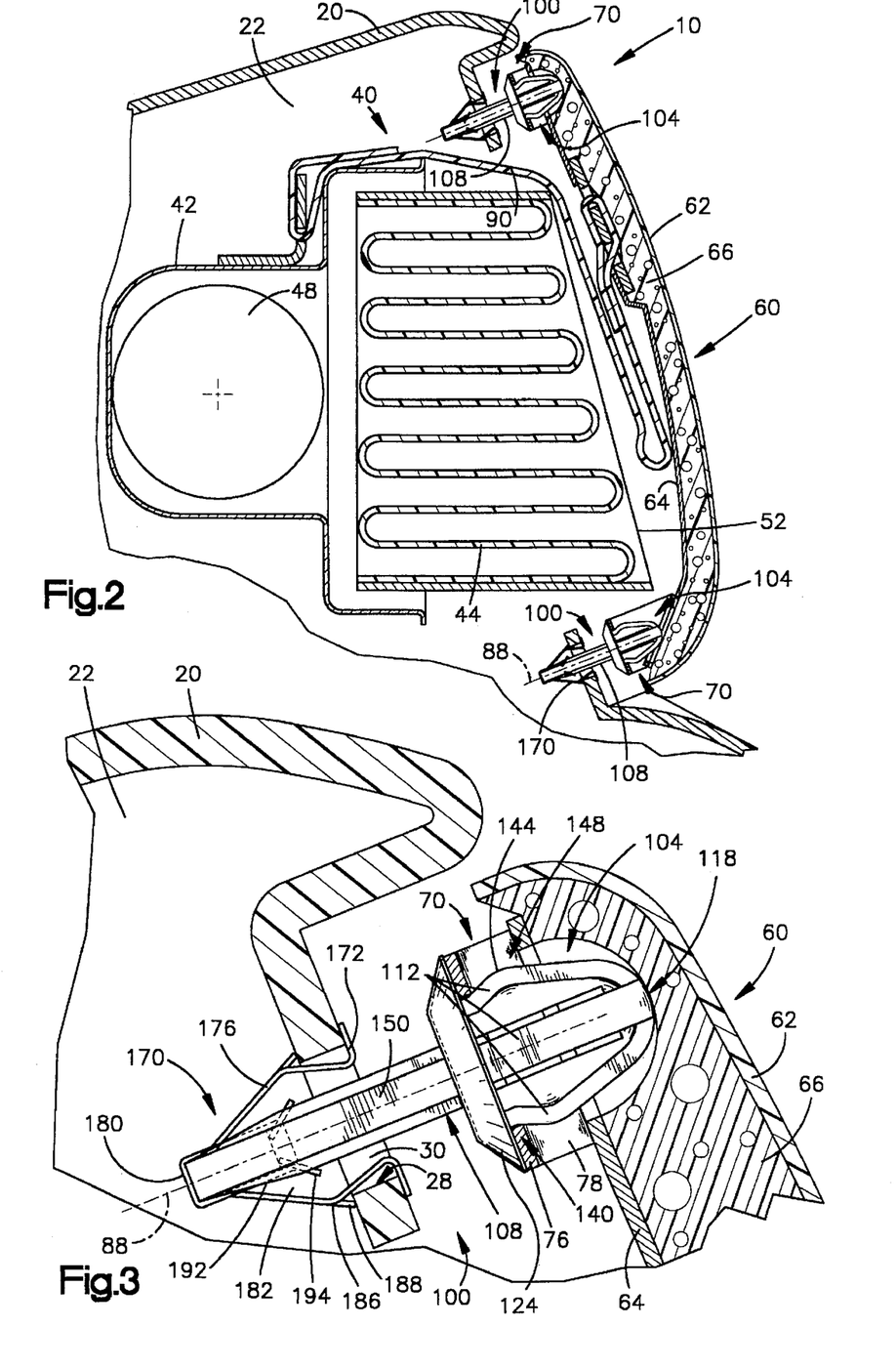
FIG. 2 is a view similar to FIG. 1 showing parts in a different position.
FIG. 3 is an enlarged view of parts of the device shown in FIG. 2.

The spring clip 170 is then inserted into the second rectangular opening 30 of the instrument panel 20 and snapped into place with the outwardly opposed ridges 186 of the clip legs 176 of the spring clip being deflected or squeezed inwardly through the second rectangular opening. The spring clip 170 snaps into position securing the fastener 100 to the substrate of the instrument panel 20. The tabs 188 of the flexible spring clip 170 engage the underside of the substrate of the instrument panel 20, thereby locking the fastener 100 and thus the cover 60 to the instrument panel as shown in FIG. 2. It should be noted that the fastener 100 and the spring clip 170 can be removed from the instrument panel 20 by pressing the clip legs 176 of the spring clip together to release the fastener from the second rectangular opening 30 of the instrument panel.

All of the conical head portions 104 of the plurality of fasteners 100 are attached to the cover 60 and have a corresponding spring clip 170 attached to their fin portions 108 in the manner discussed above. Each of the spring clips 170 is then attached to the instrument panel 20 in the manner discussed above, thereby securing the cover 60 to the instrument panel. It should be noted that the fastener arrangement of the present invention allows for varying the manner in which the cover 60 is attached to the instrument panel 20. For instance, the spring clips 170 could be attached to the instrument panel 20 before being attached to the fasteners 100 as shown in FIG. 1. Moreover, the fasteners 100 could be attached to the instrument panel 20 before being attached to the cover 60.

Figure 7:
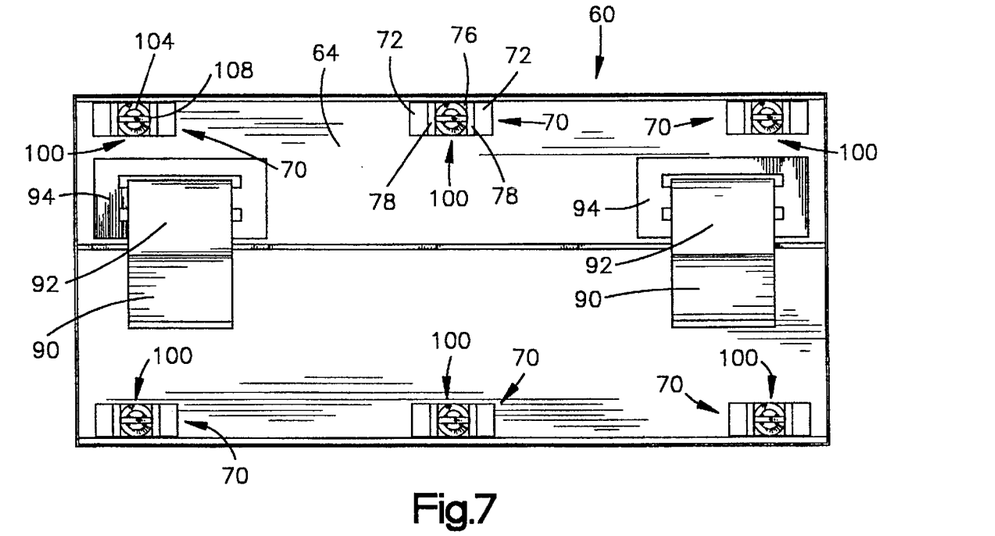
FIG. 7 is a view taken on line 7—7 of FIG. 1.

In the preferred embodiment of the present invention, as illustrated in FIG. 7, six identical fasteners 100 are employed to attach the cover 60 releasably to the instrument panel 20. Four of these fasteners 100 are spaced apart in an equidistant manner at the four corners of the cover 60. The other two fasteners 100 are spaced equidistant between the fasteners in the corners. The fifth fastener 100 is equidistant between the corner fasteners 100 along one long side of the rectangular cover 60. The sixth fastener 100 is equidistant between the corner fasteners 100 along the other long side of the cover 60. The number and placement of the second rectangular openings 30 and the brackets 70 corresponds to the number of fasteners 100. It should be noted that even though six fasteners 100, as illustrated in FIG. 7, are used to mount the cover 60 to the instrument panel 20, the number of fasteners used could vary.

Upon the occurrence of an event indicative of a vehicle collision requiring air bag inflation, a signal is sent to the inflator 48. Upon receiving the signal, the inflator 48 directs inflation fluid to flow into the air bag 44. As the inflation fluid fills the air bag 44, the air bag deploys and imparts a force against the inner surface 64 of the cover 60.

Figure 6:
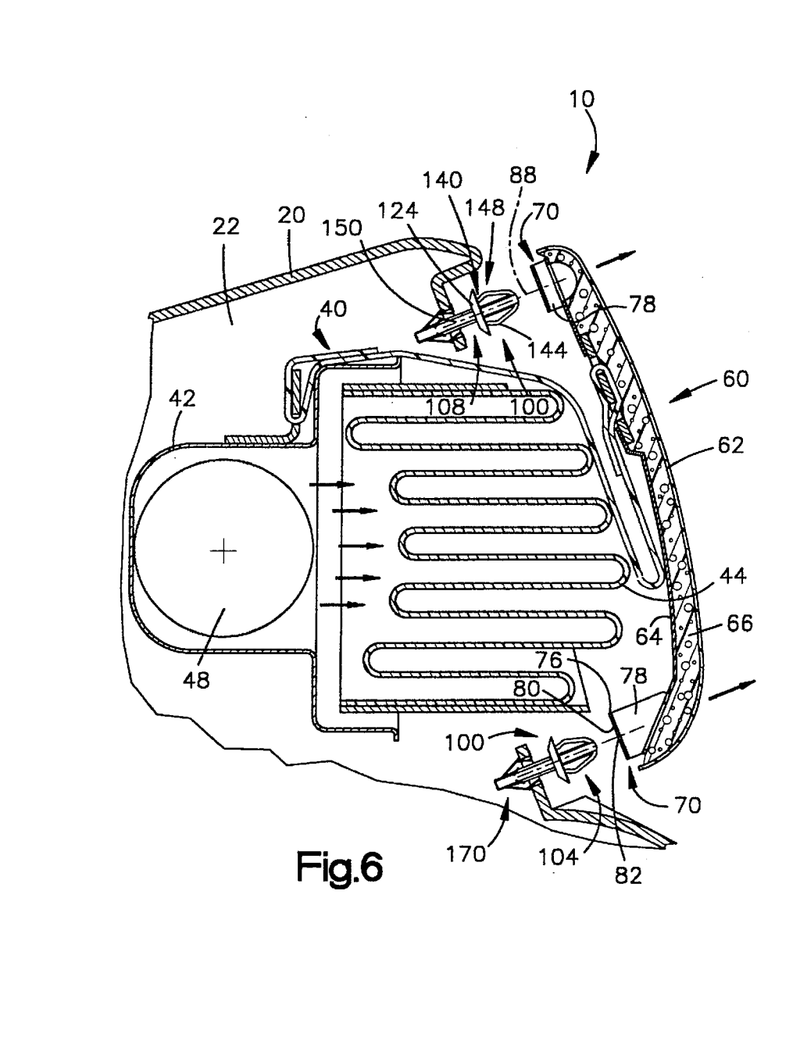
FIG. 6 is a view similar to FIG. 2 showing parts in a different position.

As the force against the inner surface 64 of the cover 60 increases, the cylindrical inner surfaces 80 of the brackets 70 engage the outer surfaces 120b of the second portions 112b of the arms 112. The arms of the conical head portions 104 are compressed radially inward so that the second diameters, D2, of the outer peripheral portions 148 are reduced to diameters which are smaller than the first diameters, D1, of the cylindrical openings 82. Once the second diameters, D2, of the outer peripheral portions 148 are reduced to diameters smaller than the first diameters, D1, the conical head portions 104 disengage from the cylindrical inner surfaces 80 of the cylindrical openings 82. The inflating air bag 44 then forces the cover 60 away from the instrument panel 20 and the stationary fasteners 100, thereby releasing the cover from the fasteners (see FIG. 6).

The vehicle occupant protection device 10 includes two identical tether straps 90 (FIG. 7). As best shown in FIG. 1, each tether strap 90 is attached at one end 92 to a first clip 94 on the inner surface 64 of the cover 60. The tether strap 90 has an opposite end 96 attached to a second clip 98 disposed on the exterior of the reaction canister 42. The tether straps 90 are provided to prevent the cover 60 from forcibly striking a vehicle occupant upon deployment of the air bag 44. During deployment of the air bag 44, the tether straps 90 control the movement of the cover 60 (FIG. 8) and hold the cover above the top side of the inflating air bag.

Figure 8:
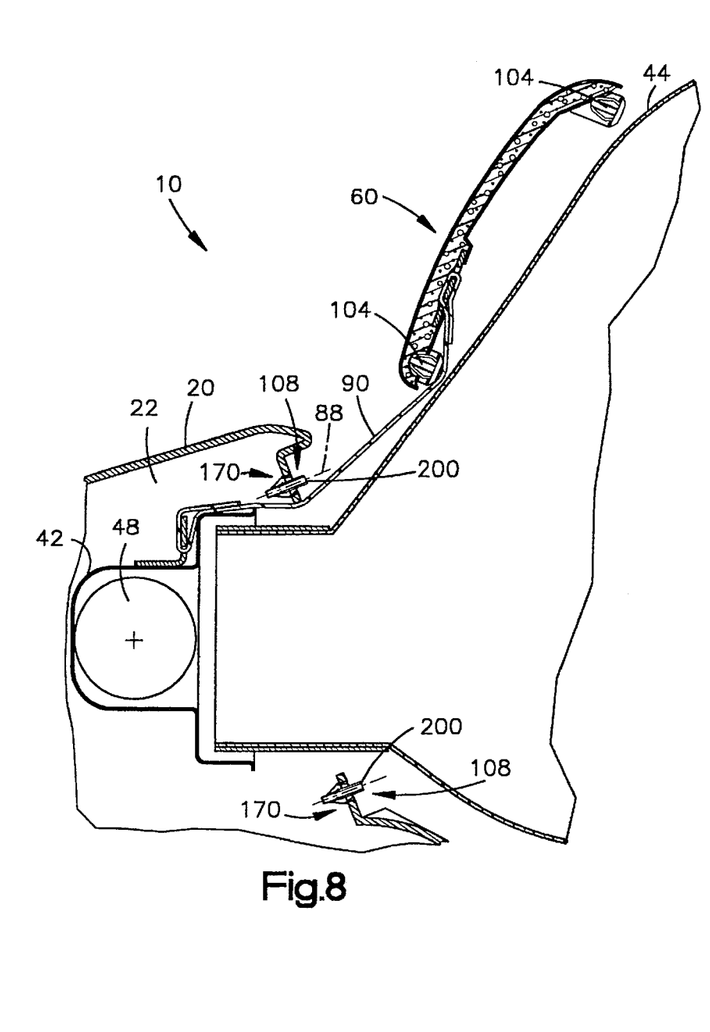
FIG. 8 is a schematic sectional view illustrating a portion of a vehicle occupant protection device constructed in accordance with a second embodiment of the present invention.

FIG. 8 illustrates a second embodiment of the invention in which the conical head portion 104 is retained within the cylindrical opening 82 of the bracket 70 during deployment of the air bag 44. In this embodiment, each of the fasteners 100 is provided with a weakened portion 200 between the shank 150 of the fin portion 108 and the disk portion 124. Upon deployment of the air bag 44, the pressure exerted on the inner surface 64 of the cover 60 is sufficient to cause the weakened portion 200 to break, thereby allowing the head portion 104 to tear apart from the fin portion 108. Thus, the conical head portion 104 remains attached to, and moves together with, the cover 60 while the fin portion 108 remains attached to the instrument panel 20.

Figure 9:
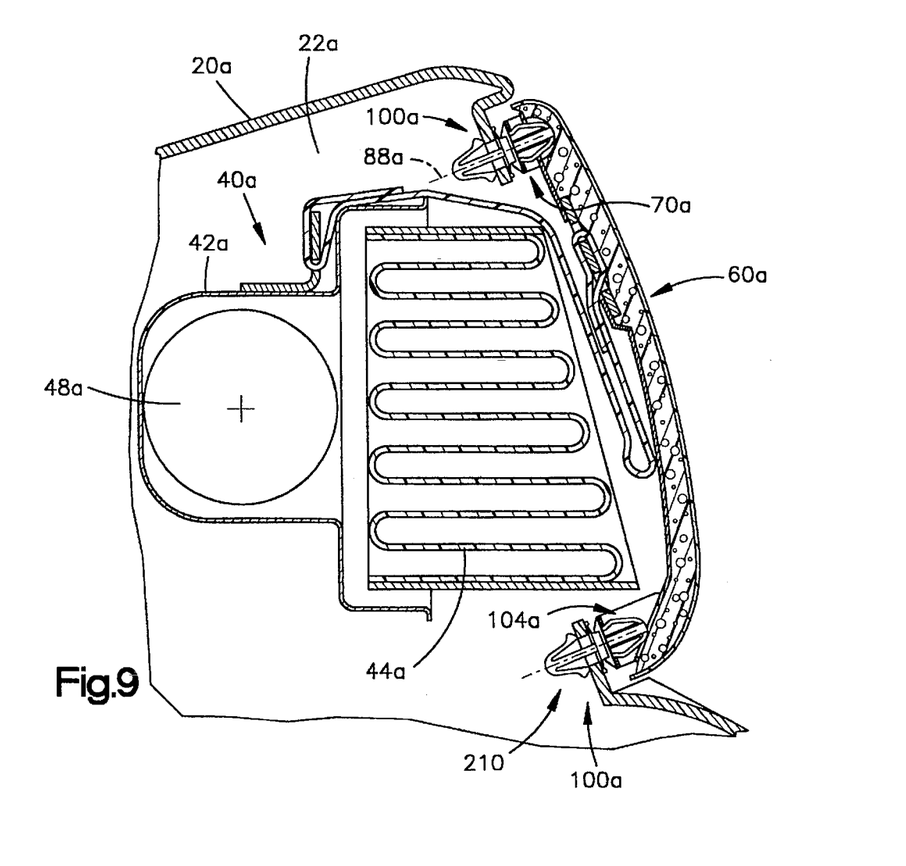
FIG. 9 is a view similar to FIG. 2 illustrating a portion of a vehicle occupant protection device constructed in accordance with a third embodiment of the present invention.

FIGS. 9-13 illustrate a third and fourth embodiment of the present invention. The vehicle occupant protection device 10 of FIG. 9 is generally similar to the protection devices illustrated in FIGS. 1-8, and parts in FIGS. 9-13 similar to parts in FIGS. 1-8 are given the same reference numerals with the suffix a.

Figure 11:
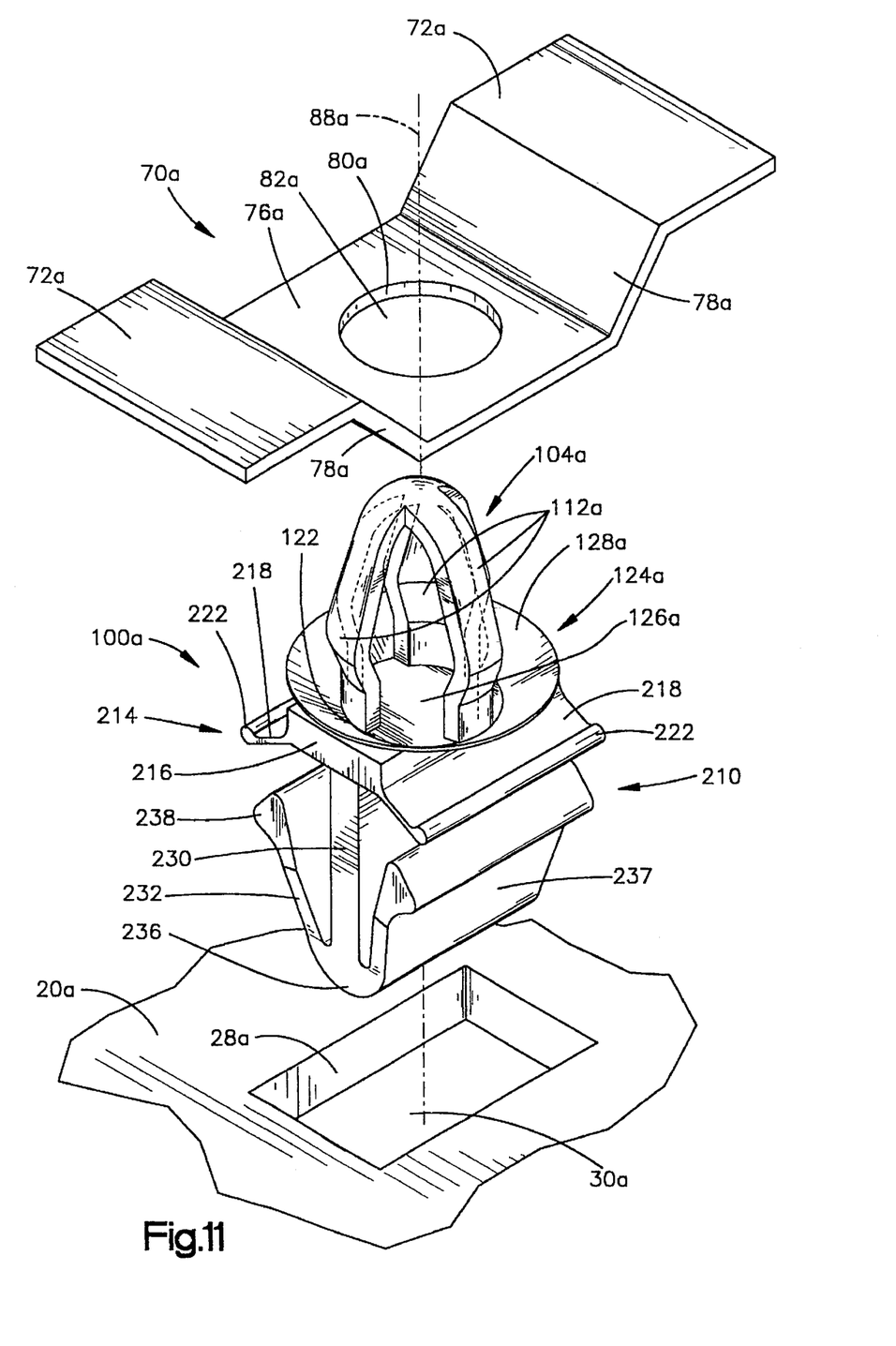
FIG. 11 is an exploded view of parts shown in FIG. 10.

The plurality of fasteners 100a of the third and fourth embodiments are substantially similar in configuration. The fasteners 100a are preferably molded one-piece plastic parts. FIG. 11 illustrates one of the fasteners 100a. The fastener 100a, shown in FIG. 11, is symmetrical about an axis 88a and includes a conical head portion 104a, a dish portion 124a, and an arrowhead portion 210. The arrowhead portion 210 replaces the two piece construction of the planar fin portion 108 and the spring clip 170 of the first and second embodiments. The arrowhead portion 210 is preferably made of a resilient plastic material and is located directly adjacent and below, as viewed in FIG. 11, the dish portion 124a.

Directly below the dish portion 124a is a deflection shield 214. The deflection shield 214 includes a generally rectangular base 216 extending the diameter of the dish portion 124a and two opposed base arms 218 extending axially and radially away, as viewed in FIG. 11, from opposing sides of the base 216. The base arms 218 each terminate in an upturned bulb portion 222.

Figure 10:
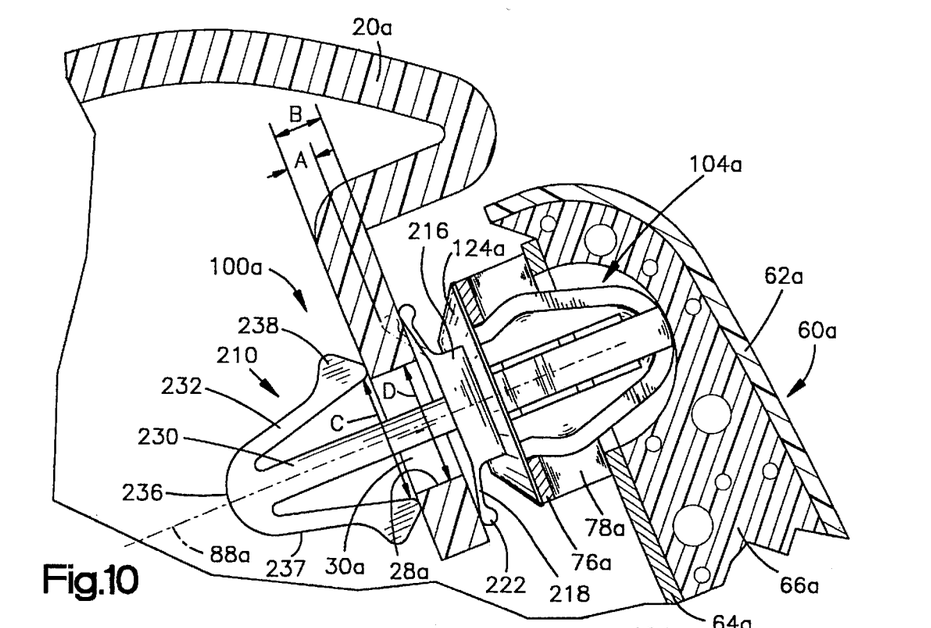
FIG. 10 is an enlarged view of the parts of the device shown in FIG. 9.

Axially extending from the underside of the base 216 is a solid rectangular-shaped shank portion 230. The shank portion 230 is located equidistant from the base arms 218. At its end away from the base 216, the shank portion 230 has two shank arms 232. The shank arms 232 extend axially and radially away from a rounded nose portion 236 towards the base 216 of the arrowhead portion 210. Each of the shank arms 232 has an outer surface 237 and terminates in an outwardly turned bulb portion 238. The lengths of the shank arms 232 are such that the shank arms 232 do not contact the base arms 218, thus defining a space between the base arms 218 and the shank arms 232. The space between the base arms 218 and the shank arms 232, as shown by A in FIG. 10, is less than the thickness, B, of instrument panel 20a.

The plurality of fasteners 100a releasably attach the cover 60a to the instrument panel 20a (FIG. 9). Since the fasteners 100a are identical, the manner in which the fasteners operate will be described with reference to one exemplary fastener with the understanding that all of the fasteners function in the same manner.

The conical head portion 104a (FIG. 10) of the fastener 100a is attached to the cover 60a in the same manner as discussed above in reference to the first and second embodiments. Once the conical head portion 104a has been attached to the cover 60a, the arrowhead portion 210 is attached to the instrument panel 20a.

The arrowhead portion 210 is inserted through a second rectangular opening 30a of the instrument panel 20a. The shank arms 232 are deflected or compressed radially inward as their outer surfaces 237 engage the rectangular edge portion 28a of the second rectangular opening 30a. Accordingly, the shank arms 232 are deflected towards the shank portion 230 so that the nose portion 236 and the shank arms can be inserted through the second rectangular opening 30a. Once the shank arms 232 pass by the rectangular edge portion 28a that defines the second rectangular opening 30a, the shank arms spring radially outward, away from the shank portion 230. In doing so, the shank arms 232 return to their initial position in which the distance, C, between their innermost edges is greater than the width, D, of the second rectangular opening 30a. In this arrangement, the substrate of the instrument panel 20a is captured between the shank arms 232 and the base arms 218. The arrowhead portion 210 is prevented from moving back through the second rectangular opening 30a, thereby securing the fastener 100a to the instrument panel 20a.

In the third and fourth embodiments, the cover 60a is released from the instrument panel 20a in the same manner as discussed in the first and second embodiments. The manner in which the plurality of the fasteners 100a operate to release the cover 60a from the instrument panel 20a will be described with reference to FIGS. 12 and 13 and one exemplary fastener, with the understanding that all of the fasteners function in the same manner.

Figure 12:
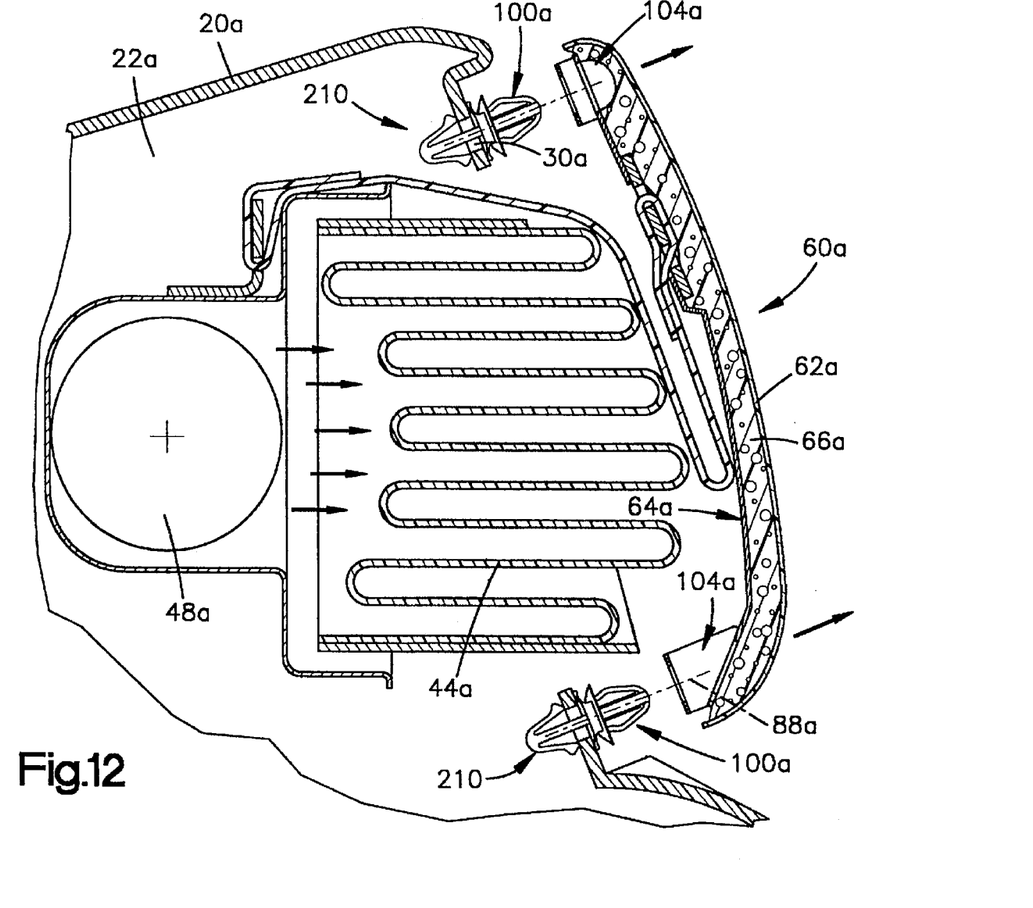
FIG. 12 is a view similar to FIG. 9 showing parts in a different position.

In the third embodiment, as illustrated in FIG. 12, upon deployment of the air bag 44a, the force on the inner surface 64a of the cover 60a from the inflating air bag 44a directs the cylindrical inner surface 80a of the bracket 70a to engage the arms 112a of the conical head portion 104a. The arms 112a are deflected radially inward to reduce the second diameter of the outer peripheral portion 148a so that the conical head portion 104a disengages from the cover 60a. The cover 60a is then directed away from the stationary fasteners 100a, which are still attached to the instrument panel 20a, by the inflating air bag 44a.

Figure 13:
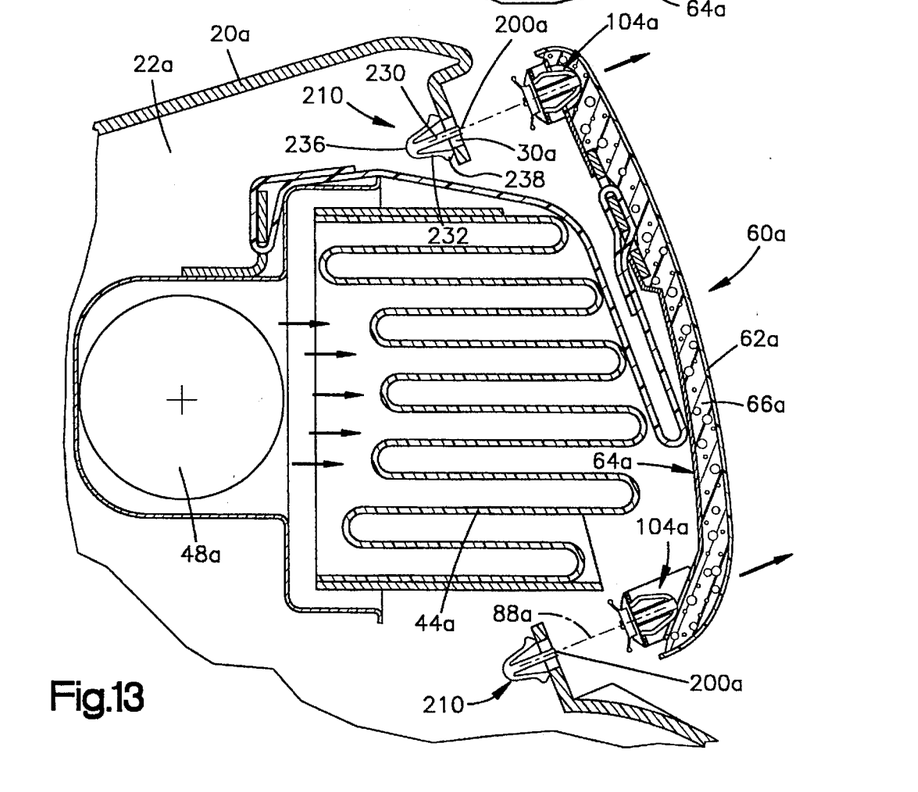
FIG. 13 is a view similar to FIG. 6 illustrating a portion of a vehicle occupant protection device constructed in accordance with a fourth embodiment of the present invention.

In the fourth embodiment, each of the fasteners 100a is provided with a weakened portion 200a (FIG. 13) on its shank portion 230. Upon deployment of the air bag 44a, the pressure exerted on the inner surface 64a of the cover 60a causes the weakened portion 200a to break, thereby allowing the head portion 104a to tear apart from the arrowhead portion 210, as shown in FIG. 13. Thus, after deployment of the air bag 44a, the conical head portion 104a remains attached to the cover 60a.

Figure 14:
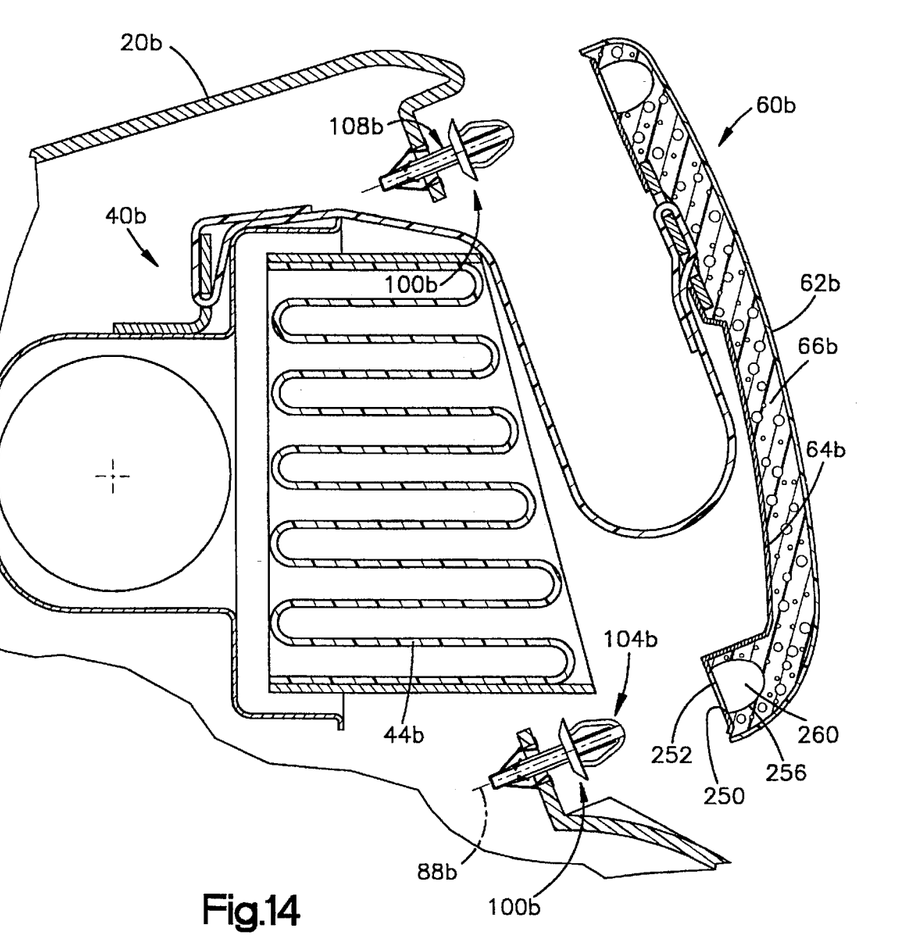
FIG. 14 is a view similar to FIG. 1 illustrating a portion of a vehicle occupant protection device constructed in accordance with a fifth embodiment of the present invention.

FIG. 14 illustrates a fifth embodiment of the present invention. The safety apparatus 10 is generally similar to the safety apparatuses (FIGS. 1–13) illustrated in the first four embodiments of the present invention and parts in FIG. 14 similar to parts in FIG. 1–13 are given the same reference numerals with the suffix b.

In the fifth embodiment, a plurality of fasteners 100b releasably attach a cover 60b to an instrument panel 20b. Any of the types of fasteners 100, 100a described in the first four embodiments can be used with the fifth embodiment of the present invention.

In the fifth embodiment, as shown in FIG. 14, the cover 60b is not provided with the brackets 70 as shown in FIGS. 1–13. Instead, the inner surface 64b (FIG. 14) of the cover 60b includes a plurality of cylindrical inner surfaces 250 defining a plurality of cylindrical openings 252. The portions of the cushion portion 66b adjacent the plurality of cylindrical openings 252 have inner edge portions 256 defining a plurality of conical recesses 260. The cylindrical openings 252 in the cover 60b are substantially the same size and shape as the cylindrical openings 82 and 82a in the brackets 70 and 70a. The conical recesses 260 are of sufficient size to receive the conical head portions 104b of the fasteners 100b.

The plurality of fasteners 100b releasably attach the cover 60b to the instrument panel 20b in the same manner as discussed in any one of the first four embodiments of the present invention with the exception that the conical head portions 104b are inserted through the cylindrical openings 252 of the cover 60b, rather than through the cylindrical openings 82 and 82a of the brackets 70 and 70a.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a vehicle occupant during a vehicle collision, said apparatus comprising:
   an inflatable vehicle occupant protection device, said inflatable vehicle occupant protection device, when inflated, being deployed through a first opening in a part of the vehicle;
   a cover securable to said vehicle part to close said first opening in said vehicle part, said cover having a plurality of second openings;
   a plurality of fasteners for releasably attaching said cover to said vehicle part, each of said plurality of fasteners comprising;
      means for attaching the fastener to the cover including a plurality of deformable arms defining a conical head portion, said arms being deformable upon insertion into a corresponding one of said second openings and returning toward their original shapes after insertion into said corresponding one of said second openings;
      a fin portion adjacent to and extending from said conical head portion; and
      means for attaching said fin portion to said vehicle part.

2. An apparatus of claim 1 wherein said means for attaching said fin portion to said vehicle part comprises a spring clip insertably lockable into a corresponding one of a plurality of third openings in said vehicle part, said fin portion being insertably lockable in said spring clip.

3. An apparatus of claim 1 wherein said means for attaching said fin portion to said vehicle part comprises an arrowhead configured portion of said fin portion which is insertably lockable into a corresponding one of a plurality of third openings in said vehicle part.

4. An apparatus of claim 1 wherein said deformable arms deform to release said cover from said vehicle part upon said cover being loaded by said deploying vehicle occupant protection device.

5. An apparatus of claim 1 wherein said fin portion has a weakened portion adjacent to said conical head portion which breaks to release said head portion from said fin portion upon said cover being loaded by said deploying vehicle occupant protection device.

6. An apparatus of claim 3 wherein said deformable arms deform to release said cover from said vehicle part upon said cover being loaded by said deploying vehicle occupant protective device.

7. An apparatus of claim 3 wherein said fin portion has a weakened portion adjacent to said conical head portion which breaks to release said head portion from said fin portion upon said cover being loaded by said deploying vehicle occupant protection device.

8. An apparatus of claim 1 wherein said conical head portion further comprises an annular groove adjacent to said fin portion.

9. An apparatus of claim 8 wherein said annular groove is received within one of said second openings upon said fastener being attached to said cover.

10. An apparatus of claim 1 wherein said cover includes a plurality of brackets, said brackets including said plurality of second openings.

11. An apparatus of claim 1 wherein each of said plurality of second openings has a first diameter, said conical head portion including at least a portion having a second diameter greater than said first diameter.

12. An apparatus of claim 1 wherein said fastener is a one-piece member.

13. An apparatus for helping to protect a vehicle occupant during a vehicle collision, said apparatus comprising:
an inflatable vehicle occupant protection device, said inflatable vehicle occupant protection device, when inflated, being deployed through a first opening in a part of the vehicle;
a cover securable to said vehicle part to close said first opening in said vehicle part, said cover having a plurality of second openings;
a plurality of fasteners for releasably attaching said cover to said vehicle part, each of said plurality of fasteners comprising;
means for attaching the fastener to the cover including a head portion, said head portion being deformable upon insertion into a corresponding one of said second openings and returning toward its original shape after insertion into said corresponding one of said second openings; and
an arrowhead configured fin portion adjacent to and extending from said head portion and including means for attaching said arrowhead configured fin portion to said vehicle part.

14. An apparatus of claim 13 wherein said means for attaching said arrowhead configured fin portion to said vehicle part comprises a portion of said arrowhead configured fin portion insertable into a corresponding one of a plurality of third openings in said vehicle part and lockable in said third opening.

15. An apparatus of claim 13 wherein said deformable head portion deforms to release said cover from said vehicle part upon said cover being loaded by said deploying vehicle occupant protection device.

16. An apparatus of claim 13 wherein said fastener is a one-piece member.

17. An apparatus of claim 13 wherein said arrowhead configured fin portion comprises a shank portion having a first end and a second end opposite said first end and two shank arms, said first end of said shank portion extending from said head portion and said shank arms extending from said second end of said shank portion, said shank arms comprising said means for attaching said arrowhead configured fin portion to said vehicle part.

18. An apparatus for helping to protect a vehicle occupant during a vehicle collision, said apparatus comprising:
an inflatable vehicle occupant protection device, said inflatable vehicle occupant protection device, when inflated, being deployed through a first opening in a part of the vehicle;
a cover securable to said vehicle part to close said first opening in said vehicle part, said cover having a plurality of second openings;
a plurality of fasteners for releasably attaching said cover to said vehicle part, each of said plurality of fasteners comprising;
means for attaching the fastener to the cover including a head portion, said head portion being deformable upon insertion into a corresponding one of said second openings and returning toward its original shape after insertion into said corresponding one of said second openings; and
an arrowhead configured fin portion adjacent to and extending from said head portion and including means for attaching said arrowhead configured fin portion to said vehicle part, said arrowhead configured fin portion having a weakened portion adjacent to said head portion which breaks to release said head portion from said arrowhead configured fin portion upon said cover being loaded by said deploying vehicle occupant protection device.

19. An apparatus for helping to protect a vehicle occupant during a vehicle collision, said apparatus comprising:
an inflatable vehicle occupant protection device, said inflatable vehicle occupant protection device, when inflated, being deployed through a first opening in a part of the vehicle;
a cover securable to said vehicle part to close said first opening in said vehicle part, said cover having a plurality of second openings;
a plurality of fasteners for releasably attaching said cover to said vehicle part, each of said plurality of fasteners comprising;
means for attaching the fastener to the cover including a head portion, said head portion having a conical shape and being deformable upon insertion into a corresponding one of said second openings and returning toward its original shape after insertion into said corresponding one of said second openings; and
an arrowhead configured fin portion adjacent to and extending from said head portion and including means for attaching said arrowhead configured fin portion to said vehicle part.

20. An apparatus of claim 13 wherein said head portion is hollow.

* * * * *